(12) United States Patent
Satou et al.

(10) Patent No.: US 7,941,008 B2
(45) Date of Patent: May 10, 2011

(54) PATTERN SEARCH METHOD

(75) Inventors: Norio Satou, Ibaraki (JP); Akiyuki Sugiyama, Hitachinaka (JP); Osamu Komuro, Hitachinaka (JP); Satoru Yamaguchi, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 304 days.

(21) Appl. No.: 11/104,632

(22) Filed: Apr. 13, 2005

(65) Prior Publication Data
US 2005/0232493 A1 Oct. 20, 2005

(30) Foreign Application Priority Data

Apr. 16, 2004 (JP) ................................. 2004-121416

(51) Int. Cl.
*G06K 9/54* (2006.01)
(52) U.S. Cl. ...................... 382/305; 382/209; 382/217
(58) Field of Classification Search .................. 382/217, 382/209, 113, 203, 305
See application file for complete search history.

(56) References Cited

U.S. PATENT DOCUMENTS

| 5,978,507 | A  | * | 11/1999 | Shackleton et al. | 382/195 |
|---|---|---|---|---|---|
| 5,982,951 | A  | * | 11/1999 | Katayama et al. | 382/284 |
| 6,002,800 | A  | * | 12/1999 | Donelly et al. | 382/216 |
| 6,463,176 | B1 | * | 10/2002 | Matsugu et al. | 382/195 |
| 6,483,893 | B1 | * | 11/2002 | Achtnig et al. | 378/98.12 |
| 6,493,465 | B2 | * | 12/2002 | Mori et al. | 382/209 |
| 6,529,630 | B1 | * | 3/2003 | Kinjo | 382/190 |
| 6,611,613 | B1 | * | 8/2003 | Kang et al. | 382/118 |
| 6,636,635 | B2 | * | 10/2003 | Matsugu | 382/218 |
| 6,993,184 | B2 | * | 1/2006 | Matsugu | 382/173 |
| 7,026,615 | B2 |   | 4/2006 | Takane et al. |  |
| 7,039,229 | B2 | * | 5/2006 | Lin et al. | 382/165 |
| 7,062,093 | B2 | * | 6/2006 | Steger | 382/216 |
| 7,127,086 | B2 | * | 10/2006 | Yuasa et al. | 382/118 |
| 7,424,672 | B2 | * | 9/2008 | Simske et al. | 715/243 |
| 7,522,772 | B2 | * | 4/2009 | Porter et al. | 382/218 |
| 2001/0050343 | A1 | * | 12/2001 | Kobaru et al. | 250/492.3 |
| 2001/0055415 | A1 | * | 12/2001 | Nozaki | 382/141 |
| 2004/0095613 | A1 | * | 5/2004 | Kuwabara | 358/450 |
| 2004/0101180 | A1 | * | 5/2004 | Doi et al. | 382/128 |

(Continued)

FOREIGN PATENT DOCUMENTS

JP 06-120310 4/1994

(Continued)

OTHER PUBLICATIONS

Office Action issued in JP2004-0121416 on Sep. 8, 2009.

(Continued)

*Primary Examiner* — Wesley Tucker
*Assistant Examiner* — Aklilu k Woldemariam
(74) *Attorney, Agent, or Firm* — McDermott Will & Emery LLP

(57) ABSTRACT

According to the pattern search method of the present invention, detection of a detection image region relative to an observation image is performed by a pattern matching. An image whose size is substantially the same as that of the observation image is used as the detection image region. The detection image region is relatively displaced with reference to the observation image, thereby detecting a degree of similarity for a common region which is common to both of the region and the image. Displacement range of the detection image region is set in advance. If area of the common region is larger than a predetermined value, calculating the degree of similarity will be performed.

17 Claims, 8 Drawing Sheets

U.S. PATENT DOCUMENTS

2004/0151381 A1* 8/2004 Porter et al. .................. 382/218
2005/0226531 A1* 10/2005 Silverstein et al. ........... 382/284

FOREIGN PATENT DOCUMENTS

| JP | 2001-209694 A | 8/2001 |
|---|---|---|
| JP | 2001-236500 | 8/2001 |
| JP | 2001-243906 | 9/2001 |

OTHER PUBLICATIONS

English language machine translation of previously cited JP 2001-236500.

English language machine translation of previously cited JP 2001-236500.

Japanese Office Action issue in Japanese Patent Application No. 2004-121416, issued on Jul. 13, 2010.

* cited by examiner

PATTERN SEARCH METHOD

BACKGROUND OF THE INVENTION

1. Field of the Invention

The present invention relates to a pattern search method suitable for being used for measurement of a circuit pattern formed on a semiconductor wafer. More particularly, it relates to a pattern search method for detecting the circuit pattern by a pattern matching scheme.

2. Description of the Related Art

At semiconductor fabrication processing steps, line width or the like of a circuit pattern formed on a semiconductor wafer is measured by a measurement device including a scanning electron microscope. In the measurement of the circuit pattern like this, it is required to detect a measurement position on the image of the circuit pattern.

From conventionally, a pattern matching scheme based on a template has been known as a method for detecting a predetermined measurement position from the image of a circuit pattern. According to this scheme, a small image region including a measurement target is cut out from the image of the circuit pattern, then registering the small image region as a template in advance. When an image including the measurement target is given at the measurement processing step, the scanning is performed while comparing the template with the image. Moreover, degree of similarity between the template and a screen region with which the template is compared will be checked. Then, if the degree of similarity is found to be high, it is judged that the screen region is the image region including the measurement target.

In recent years, the following technologies have been introduced: Short-wavelength implementation for light-exposure laser of light-exposure machine, and novel technologies on light-exposure mask (such as phase shift mask and OPC). If a circuit pattern formed under the formation conditions like this is observed with a high magnification, there appears a gently curved and low space-frequency configuration. Namely, characteristics of the pattern are dispersed. In particular, in the case of a memory cell or the like, there often appears the gently curved pattern or a repeated pattern.

In conventional methods, if the pattern of the image region cut out as the template exhibits only a small difference when compared with pattern of another image region, the position detection becomes difficult, or an error occurs.

In an embodiment disclosed in JP-A-6-120310, a small region including characteristic portion of a measurement target is cut out, then registering the small region as a first template. Also, a region including the entire measurement target is cut out, then registering the region as a second template. When an observation image is given, at first, the measurement target is detected by a pattern matching based on the first template. If, however, the region cut out as the first template extends off the observation image, a pattern matching based on the second template is performed, thereby detecting position of the measurement target. Then, if the position of the measurement target has been detected, the accurate position is identified based on the first template.

SUMMARY OF THE INVENTION

In the embodiment disclosed in JP-A-6-120310, if the pattern matching based on the first template has been found to be unsuccessful, the pattern matching based on the second template is performed. Then, the position search based on the first template is performed again. This increases the number of the processing steps.

It is an object of the present invention to provide a pattern search method which allows a pattern search to be performed efficiently and with a high accuracy even in the case of a pattern having a monotonous and low space-frequency configuration or a pattern having many repetitions.

According to the pattern search method of the present invention, an image whose size is substantially the same as that of an observation image is used as a detection image region. The detection image region is relatively displaced with reference to the observation image, thereby detecting a degree of similarity for a common region which is common to both of the region and the image. Displacement range of the detection image region is set in advance. When an area of the common region is larger than a predetermined value, calculating the degree of similarity will be performed.

According to the pattern search method of the present invention, at first, a pattern matching is performed in such a manner that the observation image and the detection image region are reduced in size, thereby performing an approximate position detection. Next, in a proximity to approximate detected positions acquired in this way, a pattern matching is performed with respect to the original observation image and detection image region. This allows detection of accurate positions.

According to the present invention, it becomes possible to perform a pattern search efficiently and with a high accuracy even in the case of a pattern having a monotonous and low space-frequency configuration or a pattern having many repetitions.

Other objects, features and advantages of the invention will become apparent from the following description of the embodiments of the invention taken in conjunction with the accompanying drawings.

DETAILED DESCRIPTION OF THE INVENTION

Figure 1:
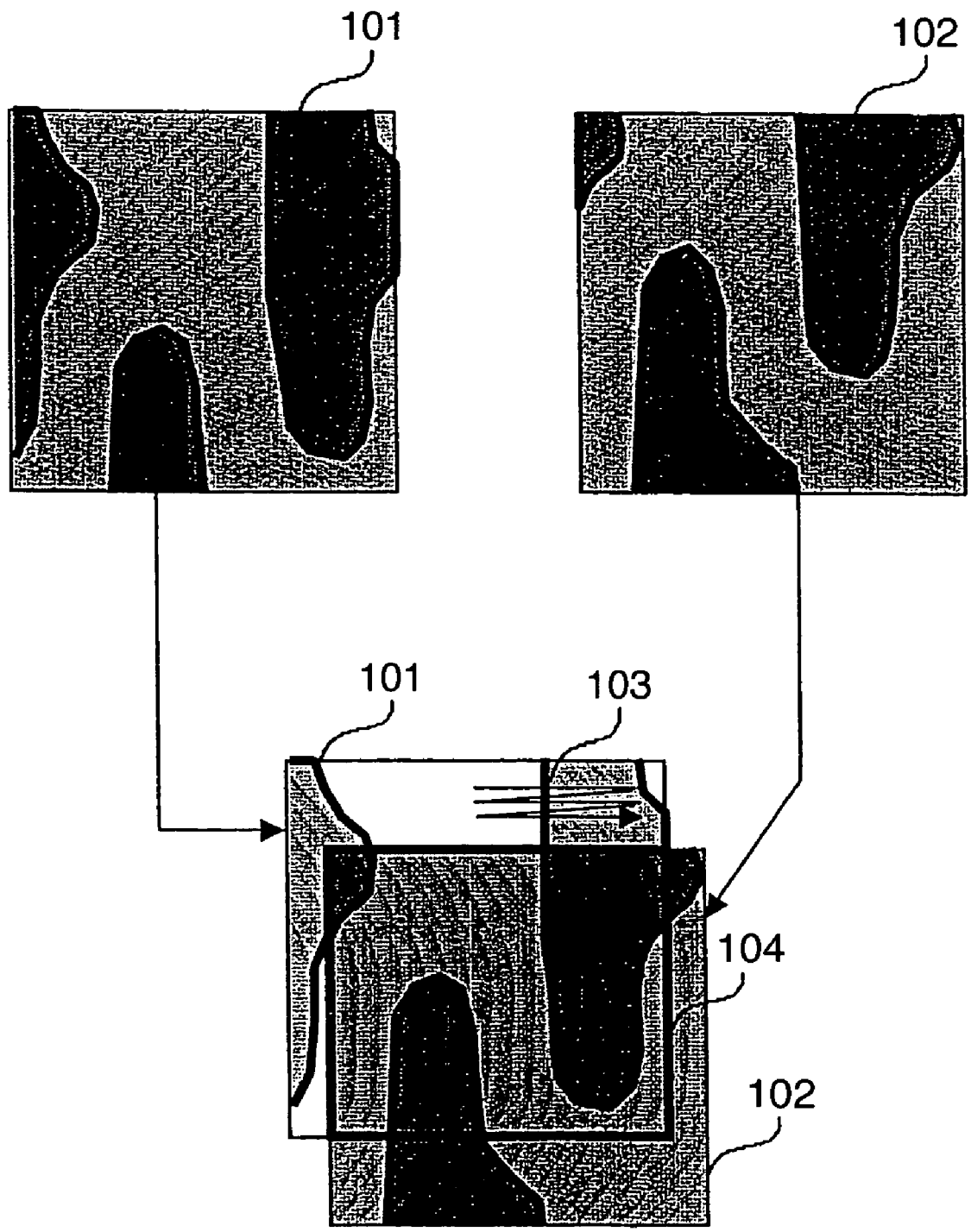
FIG. 1 is an explanatory diagram for explaining outline of a pattern search method according to the present invention.

Referring to FIG. 1, the explanation will be given below concerning outline of the present invention. A detection image region 101, which corresponds to the conventional template, is an image region which includes image of configuration or pattern of a detection target. For example, when measuring line width of a specific position, the detection image region 101 is an image region which includes the line width of the position. Although, as the detection image region 101, an image acquired by an electron microscope is usually used, an image acquired by an optical electron microscope or an image created from information on CAD data can also be used.

An observation image 102 is an image which becomes the target in which the detection image region 101 is detected. For example, at semiconductor fabrication processing steps, the observation image 102 is image of a circuit pattern on a wafer which becomes the target of the inspection or measurement. Although, as the observation image 102, an image acquired by the electron microscope is usually used, an image acquired by the optical electron microscope or a CCD camera can also be used in some cases.

A pattern matching is performed with respect to the detection image region 101 and the observation image 102 by the pattern matching scheme. Namely, the detection image region 101 and the observation image 102 are superimposed while gradually shifting the relative positions therebetween in a scanning direction 103. This makes it possible to calculate degree of similarity in the range of a common region 104 which is common to both of the images 101 and 102. The relative position at which the degree of similarity at this time proves to be the highest is defined as a detection position. Here, as criterion for measuring the degree of similarity, normalized correlation has been generally known.

The detection image region 101 and the observation image 102 are formed of images whose magnifications are equal to each other. Simultaneously, size of the detection image region 101, preferably, is substantially the same as that of the observation image 102. As the observation image 102, an image acquired by a scanning microscope or the like is usually used just as it is. As the detection image region 101, an image acquired by the scanning microscope or the like may also be used just as it is. Namely, according to the present embodiment, as the detection image region 101, the entire image acquired by the scanning microscope or the like is used just as it is, i.e., without cutting out the image.

In the present embodiment, since the common region 104 is large enough in size, it becomes possible to acquire the degree of similarity with a high accuracy. Incidentally, in the embodiment in FIG. 1, the size of the detection image region 101 is substantially the same as that of the observation image 102. Both of the sizes, however, may be slightly different from each other.

Figure 2:
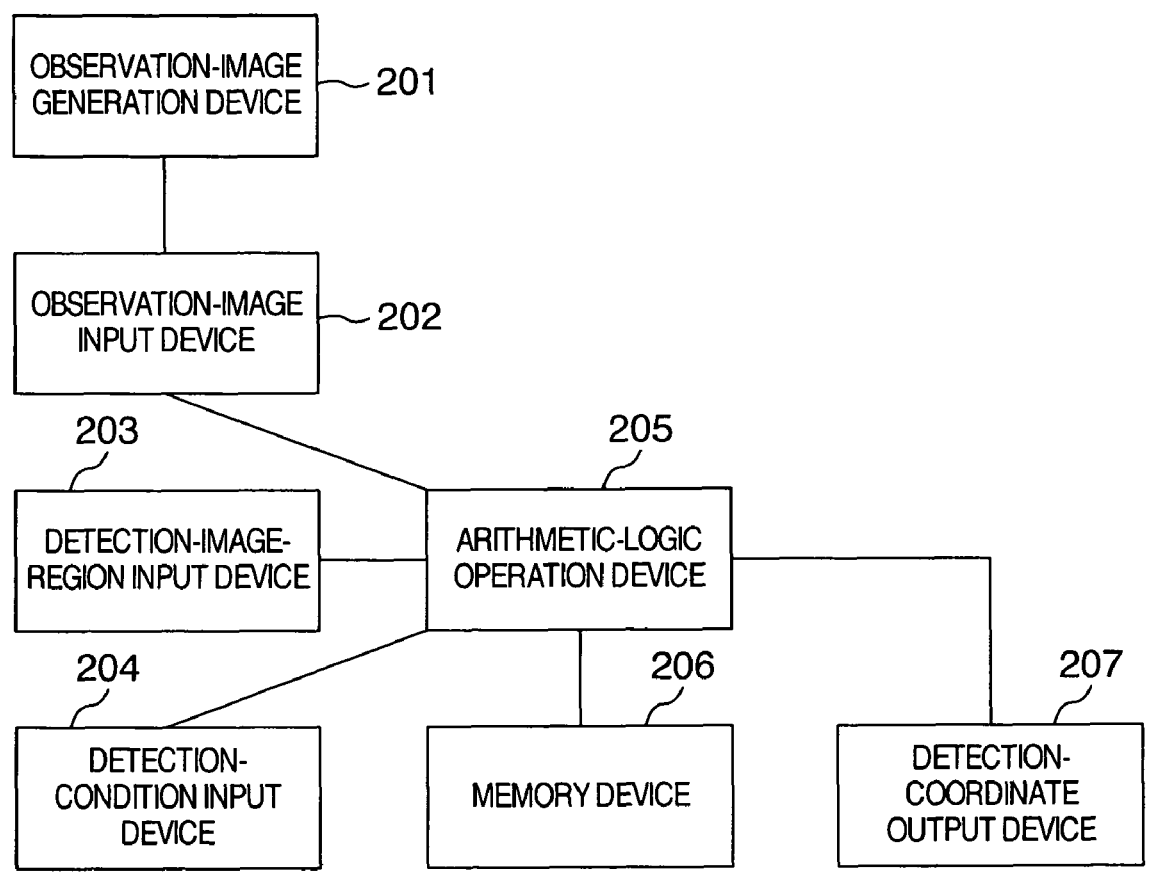
FIG. 2 is a diagram for illustrating configuration of a pattern search device according to the present invention.

FIG. 2 is a block diagram for illustrating configuration of a pattern search device according to the present invention. The pattern search device in the present embodiment includes the following components. An observation-image generation device 201, an observation-image input device 202, a detection-image-region input device 203, a detection-condition input device 204, an arithmetic-logic operation device 205, a memory device 206, and a detection-coordinate output device 207.

The observation-image generation device 201 is a device for generating the observation image 102. Although, as the device 201, the scanning electron microscope is usually used, the optical electron microscope or the CCD camera may also be used. The observation-image input device 202 inputs the observation image 102 from the observation-image generation device 201. The arithmetic-logic operation device 205 stores the observation image into the memory device 206.

The detection-image-region input device 203 inputs the detection image region 101. The detection image region may be inputted from the observation-image generation device 201. Otherwise, the detection image region may be acquired by a method of determining a pattern by CAD data, or a method of storing in advance and reutilizing data which had been measured before. As explained earlier, the detection image region 101 and the observation image 102 are of the same magnification, and have substantially the same sizes. The detection-condition input device 204 inputs detection conditions used when executing the pattern detection.

The detection conditions include the following items, for example.

(1) The Size of the Detection Image Region 101 and that of the Observation Image 102

As will be explained below, the sizes are used in cases such as determining, e.g., ratio of an area of the common region 104 relative to the observation image 102. The sizes may also be of categories such as the number of pixels, coordinates at four corners, and the area acquired when converted to a real sample.

(2) Threshold Values

As threshold values, there exist the following categories. A threshold value for correlation values for performing a judgment on the correlation values, a threshold value for area for performing a judgment on the area of the common region 104, and the like. The threshold value for the correlation values is used for making the judgment as to whether or not to record the detection positions. If the correlation values are larger than the threshold value, the detection positions at that time will be recorded. Meanwhile, if the correlation values are smaller than the threshold value, the detection image region 101 will be displaced up to the next position without performing the position recording.

As the threshold value for the area, there exist the following categories. The threshold value for the area of the common region 104, a threshold value for the ratio of the area of the common region 104 relative to the observation image 102, threshold values for a longitudinal width and a transverse width of the common region 104, a threshold value for ratio of the longitudinal width of the common region 104 relative to the observation image 102, a threshold value for ratio of the transverse width of the common region 104 relative to the observation image 102, and the like. Incidentally, the area of the common region 104 may be not only the number of pixels, but also the area acquired when converted to a real sample.

The threshold value for the area is used for making a judgment as to whether or not to calculate the correlation values. If the area is larger than the threshold value, the correlation values will be calculated. Meanwhile, if the area is smaller than the threshold value, the detection image region 101 will be displaced up to the next position without performing the calculation of the correlation values. In the case of the present embodiment, the area of the observation image 102 and that of the detection image region 101 are substantially the same. Consequently, if the area of the common region 104 is small, the detection image region 101 can be considered to have overlapped with the observation image 102 along the peripheral portion of the image 102. In the case like this, the calculation of the correlation values will not be performed, since accuracy of the correlation values can be considered low.

(3) Range of the Relative Coordinates

The range of the relative coordinates means coordinate values in maximum displacement range of the detection image region 101 when relatively displacing the detection image region 101 with reference to the observation image 102 in the scanning direction. This range means, e.g., the maximum values and minimum values in the x direction and y direction.

(4) Correlation-Value Calculation Start and Calculation Termination Positions

These positions are positions at which the calculation of the correlation values is to be started and terminated when relatively displacing the detection image region 101 with reference to the observation image 102 in the scanning direction. In order to perform the position detection effectively, the calculation of the correlation values is performed only in a region where it is highly likely that accurate correlation values will be acquired.

(5) Condition on Output Values

When the calculation of the correlation values and the position detection have been terminated, these pieces of data will be outputted. However, all the data will not be outputted but, of all the data, only meaningful data will be outputted.

Here, let's refer to FIG. 2 again. The detection conditions inputted by the detection-condition input device 204 are stored into the memory device 206 along with the detection image region 101 inputted by the detection-image-region input device 203.

The arithmetic-logic operation device 205 performs the pattern matching processing which will be explained below. Namely, the arithmetic-logic operation device 205, based on the detection conditions, performs the pattern matching between the detection image region 101 and the observation image 102, thereby creating detection positions. The detection positions acquired by the arithmetic-logic operation device 205 are stored into the memory device 206 once. Then, the detection positions stored into the memory device 206 are subjected to a detection processing by the arithmetic-logic operation device 205. After the detection processing has been terminated, the detection positions are outputted from the detection-coordinate output device 207.

Figure 3:
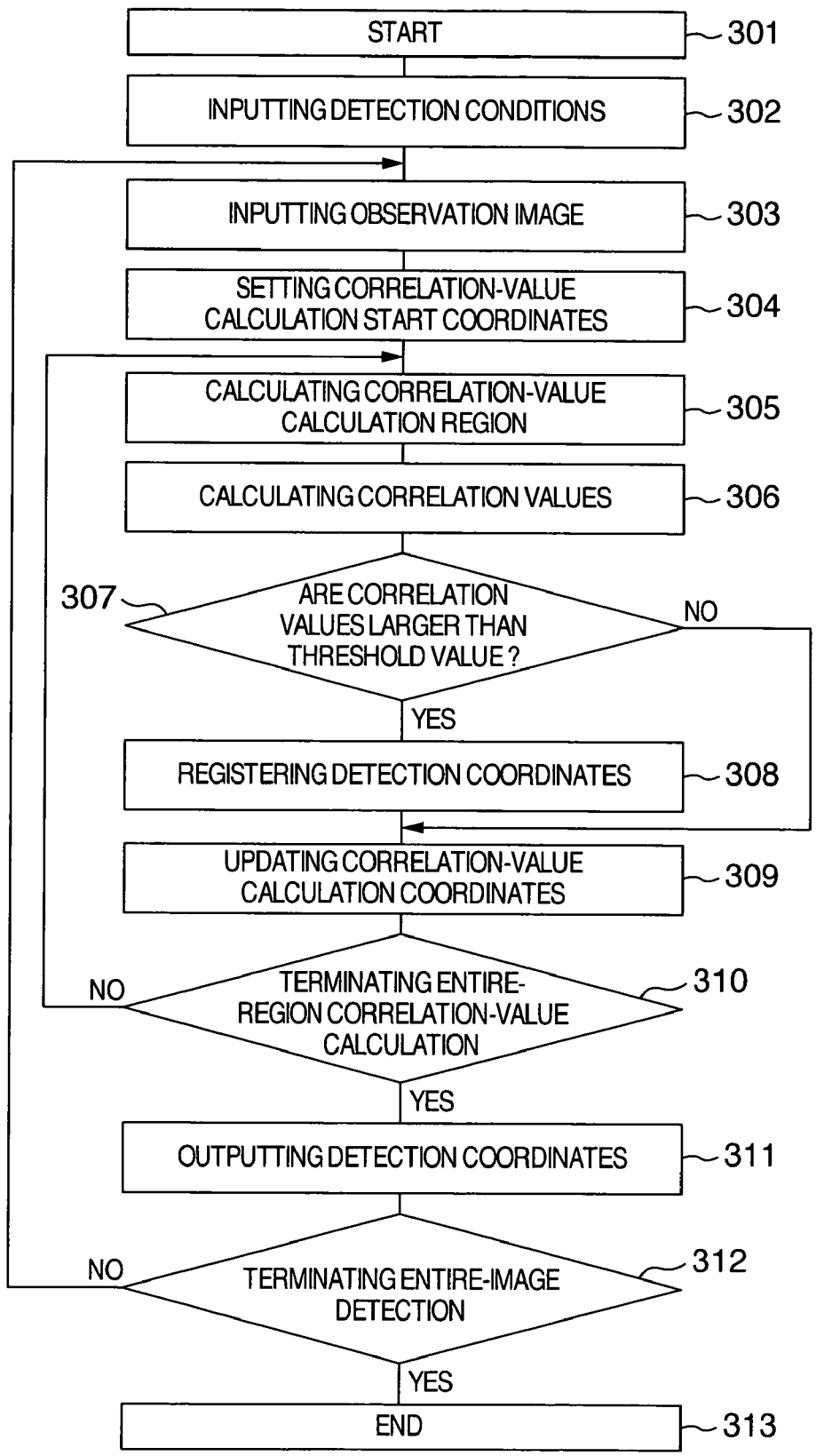
FIG. 3 is an explanatory diagram for explaining a first embodiment of processing in the pattern search method according to the present invention.

Referring to FIG. 3, the explanation will be given below concerning a first embodiment of processing in the pattern search method according to the present invention. The processing is started from Start at a step 301. In a detection-condition input processing at a step 302, the detection conditions are inputted. The detection conditions include the items such as the size of the detection image region 101 and that of the observation image 102, the threshold values, and the range of the relative coordinates.

In an observation-image input processing at a step 303, the observation image 102 is inputted. The observation image 102 may be directly inputted from the electron microscope, or may be the one saved in the memory device 206. As described earlier, in addition to the image acquired by the electron microscope, the observation image 102 may also be the image acquired by the optical microscope or the CCD camera.

In a correlation-value calculation-start-coordinate set processing at a step 304, coordinates at which the calculation of the correlation values is to be started are set. This start coordinates may be the one inputted in advance in the detection-condition input processing at the step 302.

In a correlation-value calculation-region calculation processing at a step 305, a range of the common region 104 is detected. Here, the range of the common region 104 is the target in which the correlation values are to be calculated. In a correlation-value calculation processing at a step 306, the correlation values falling in the range of the common region 104 are calculated. In a first loop, the correlation values are calculated at the coordinate positions set in the correlation-value calculation-start-coordinate set processing at the step 304. The calculation method for the correlation values has been well known already, and thus the details will be omitted.

In a judgment processing at a step 307, it is judged whether or not the correlation values are larger than the threshold value. If the correlation values are larger than the threshold value, the processing proceeds to a step 308. Meanwhile, if the correlation values are not larger than the threshold value, the processing proceeds to a step 309. In a detection-coordinate registration processing at the step 308, relative coordinate positions between the detection image region 101 and the observation image 102 are registered. In a correlation-value calculation-coordinate update processing at the step 309, new coordinates at which calculation of the correlation values is to be performed next are set. In a judgment on entire-region correlation-value calculation termination at a step 310, it is judged whether or not the pattern matching processing in the entire region of the range of the relative coordinates inputted at the detection-condition input step 302 has been terminated. If the pattern matching processing in the entire region has been not terminated, the processing returns to the correlation-value calculation-region calculation processing at the step 305. In a second loop, at the step 305, the range of the common region 104 is detected at the new coordinates updated by the correlation-value calculation-coordinate update processing at the step 309.

In a detection-coordinate output processing at a step 311, the coordinates registered in the detection-coordinate registration processing at the step 308 are outputted. As sequence of the coordinates to be outputted here, the sequence registered in the detection-coordinate registration processing at the step 308 may be used. Otherwise, the sequence in size of the correlation values calculated in the correlation-value calculation processing at the step 306 may also be used. In order to limit the number of the coordinates to be outputted, an upper-limit of the number of the coordinates to be outputted may be set in the detection-condition input processing at the step 302. If the plural coordinates registered in the detection-coordinate registration processing at the step 308 are extremely close to each other, or if the correlation values between two points are monotonously increasing or monotonously decreasing, the portion whose coordinate or correlation value is the highest of them all is outputted as the representative point, and the other portions need not be outputted. In an entire-image detection termination processing at a step 312, it is judged whether or not the pattern matching processing has been terminated for the entire image. If the pattern matching processing for the entire image has been not terminated, the observation-image input processing at the step 303 is repeated. Meanwhile, if the pattern matching processing has been terminated for the entire image, the processing is terminated at End at a step 313.

Figure 4:
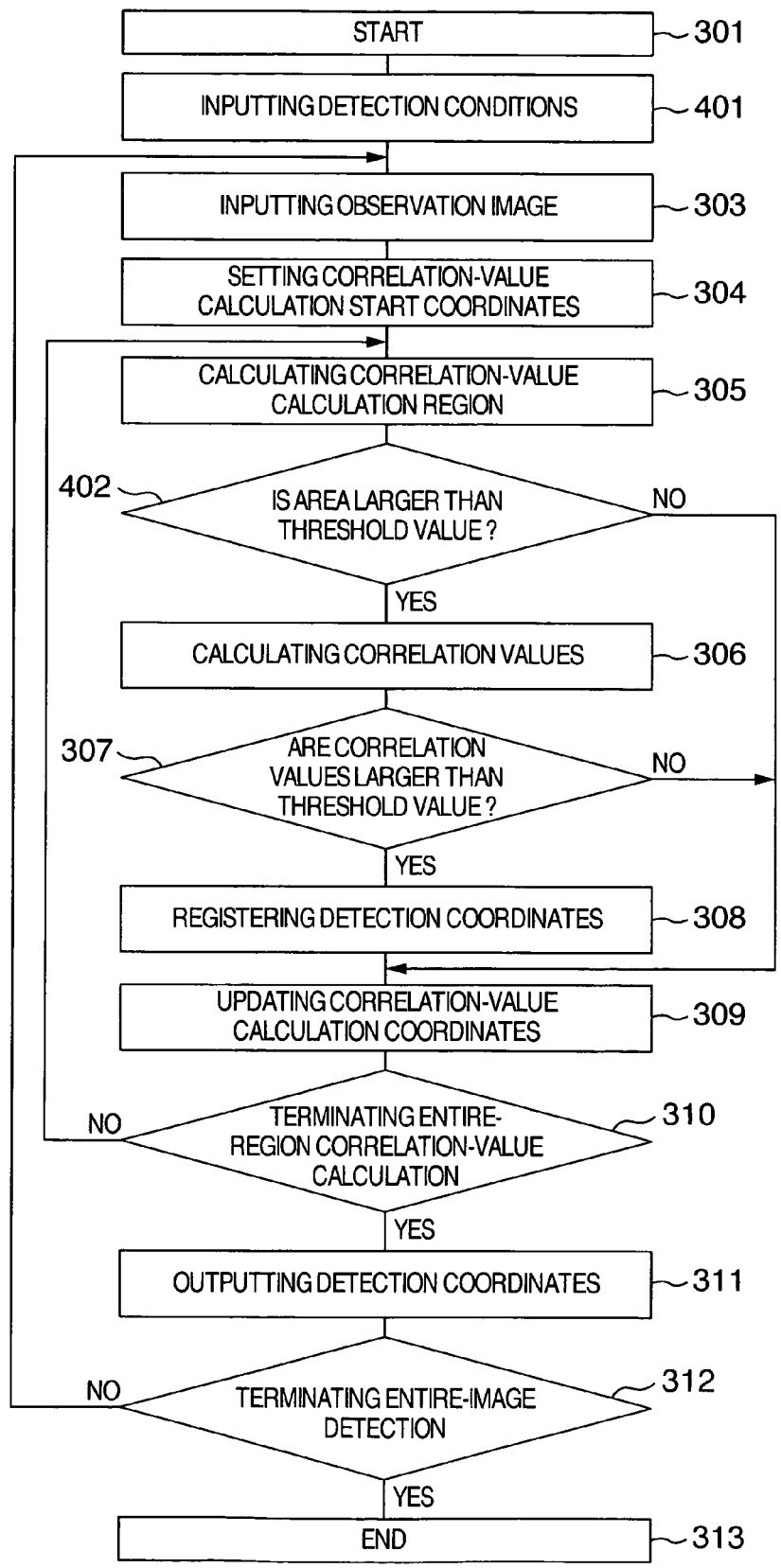
FIG. 4 is an explanatory diagram for explaining a second embodiment of processing in the pattern search method according to the present invention.

Referring to FIG. 4, the explanation will be given below concerning a second embodiment of processing in the pattern search method according to the present invention. The same reference numeral is affixed to the processing which is the same as the one in the pattern search method in FIG. 3. Accordingly, the detailed explanation thereof will be omitted. The processing is started from Start at the step 301. In a detection-condition input processing at a step 401, the detection conditions are inputted. In the present embodiment, the detection conditions include the items such as the size of the detection image region 101 and that of the observation image 102, the threshold values, the range of the relative coordinates, and the threshold value for the area of the common region 104.

As described earlier, as the threshold value for the area, there exist the following categories. The threshold value for the area of the common region 104, the threshold value for the ratio of the area of the common region 104 relative to the observation image 102, the threshold values for a the longitudinal width and the transverse width of the common region 104, the threshold value for ratio of the longitudinal width of the common region 104 relative to the observation image 102, the threshold value for ratio of the transverse width of the common region 104 relative to the observation image 102, and the like. Incidentally, the area of the common region 104 may be not only the number of pixels, but also the area acquired when converted to a real sample.

In a judgment processing at a step 402, it is judged whether or not the area of the common region 104 is larger than the threshold value. If the area is larger than the threshold value, the processing proceeds to the step 306. Meanwhile, if the area is smaller than the threshold value, the processing proceeds to the step 309. Namely, in the present embodiment, if the area of the common region 104 is smaller than the threshold value, accuracy of the correlation values is regarded as being low. Accordingly, the calculation of the correlation values will not be performed.

Figure 5:
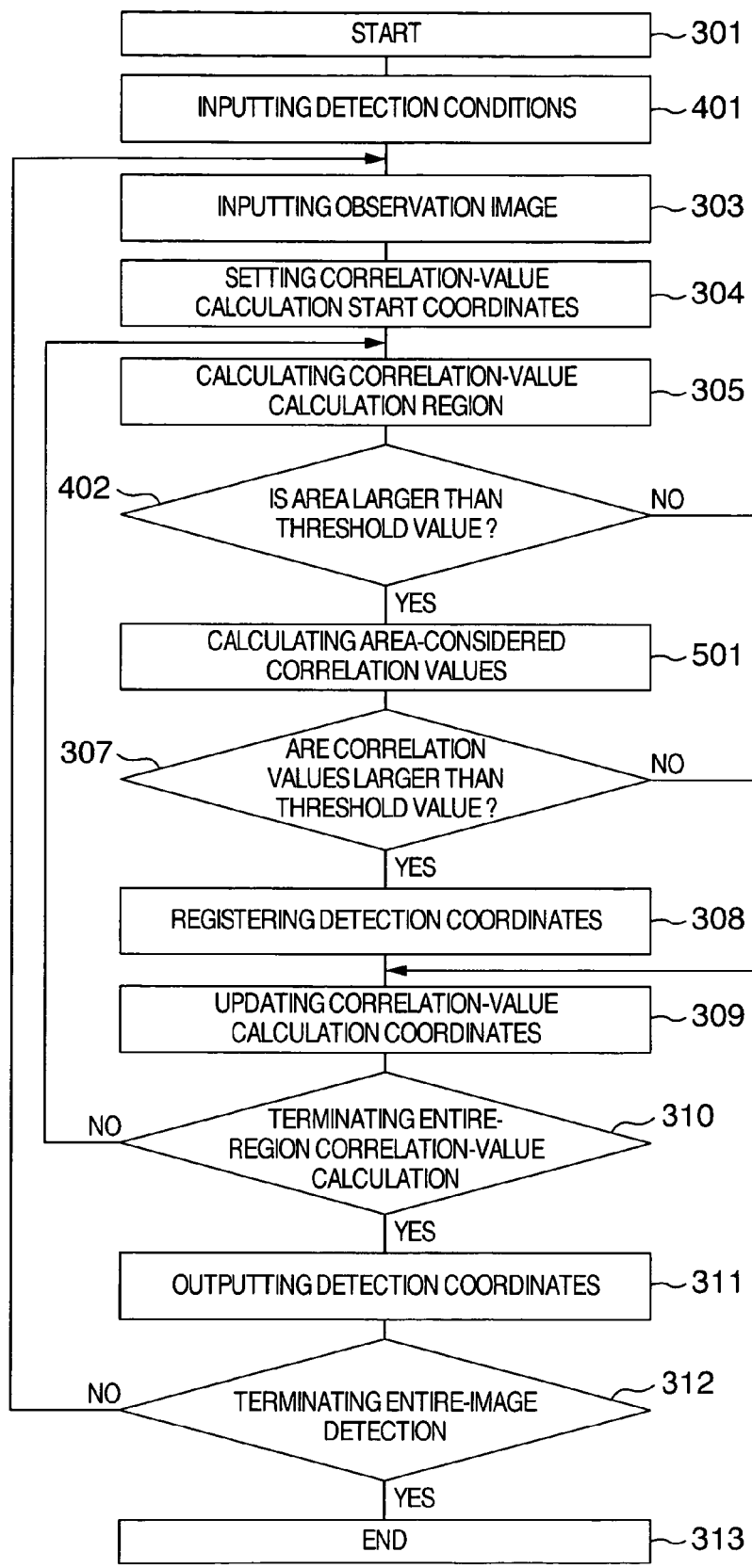
FIG. 5 is an explanatory diagram for explaining a third embodiment of processing in the pattern search method according to the present invention.

Referring to FIG. 5, the explanation will be given below concerning a third embodiment of processing in the pattern search method according to the present invention. In FIG. 5, the same reference numeral is affixed to the processing which is the same as the one in the pattern search methods in FIG. 3 and FIG. 4. Accordingly, the detailed explanation thereof will be omitted. The processing is started from Start at the step 301.

In an area-considered correlation-value calculation processing at a step 501, the correlation values resulting from considering the area of the common region 104 are calculated. In general, when calculating a correlation value in the common region 104, it can be considered that the accuracy of the correlation value becomes higher as the area of the common region 104 becomes larger. For example, when one and the same correlation value has been calculated at different positions, it can be considered that the accuracy of the correlation value is higher as the area of the common region 104 is larger. Consequently, as indicated in the following Expression 1, by introducing the area of the common region 104 as a coefficient, it becomes possible to acquire the correlation values resulting from considering the area.

area-considered correlation values=correlation values×area         Expression 1

Also, an arbitrary function f whose variables are defined as the area and the correlation values may be introduced.

area-considered correlation values=$f$ (correlation values, area)         Expression 2

In Expression 1, instead of the multiplication by the area, multiplication by the coefficient representing the area may be performed. At the step 307, the comparison is made between the area-considered correlation values and the threshold value.

Figure 6:
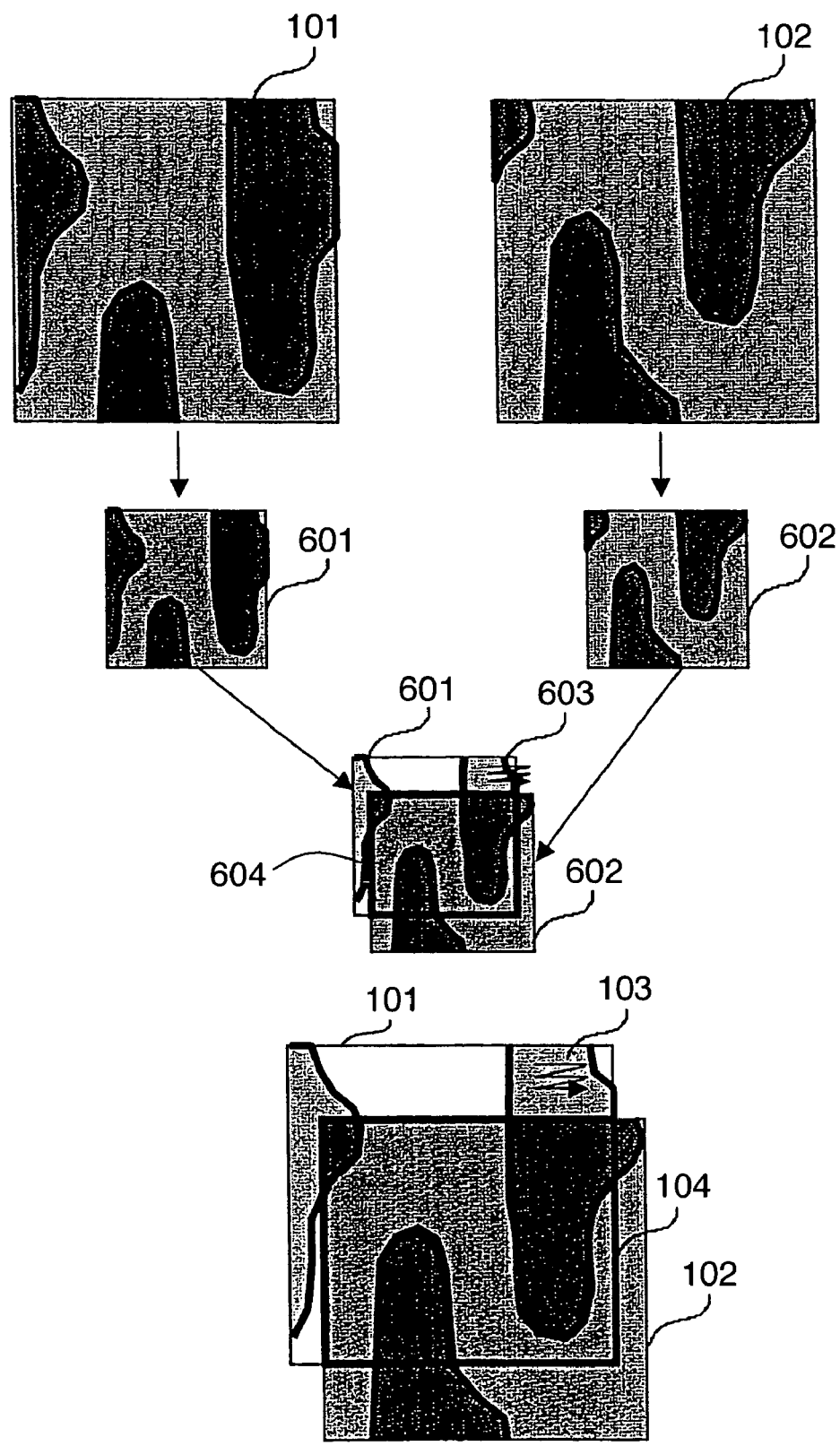
FIG. 6 is an explanatory diagram for explaining a fourth embodiment of processing in the pattern search method according to the present invention.

Referring to FIG. 6, the explanation will be given below concerning a fourth embodiment of processing in the pattern search method according to the present invention. According to the present embodiment, at first, the detection image region 101 and the observation image 102 are reduced in size with an appropriate and the same magnification. Then, similarly to the first embodiment in FIG. 1, a detection image region 601 and an observation image 602 reduced in this way are superimposed while gradually shifting the relative positions therebetween in a scanning direction 603. This makes it possible to check correlation values in a common region 604 common to both of the images 601 and 602, thereby allowing determination of detection positions. The detection positions determined in this way exhibit only a low accuracy, since the detection positions have been determined using the reduced images. Next, the reduced detection image region 601 and observation image 602 are enlarged in size, thereby acquiring the original detection image region 101 and observation image 102. Moreover, in a proximity to the detection positions determined using the reduced images, correlations between the detection image region 101 and the observation image 102 are checked, thereby acquiring the detection positions. The detection positions determined using the enlarged images in this way exhibit a high accuracy.

In the present embodiment, the approximate detection positions are determined using the reduced detection image region 601 and observation image 602. This configuration allows the processing time to be decreased as compared with the case where the detection positions are directly determined using the detection image region 101 and the observation image 102. Here, the time needed for determining the detection positions using the reduced images 601 and 602 will be calculated. Letting reduction ratios of both images in longitudinal and transverse directions be, e.g., 1/n each, the displacement amount in the scanning direction becomes equal to $(1/n)^2$. Also, a time needed for calculating the correlation values in the common region 604 becomes equal to $(1/n)^2$, assuming that this time is proportional to the area. Consequently, the processing time becomes equal to $(1/n)^4$ in total.

Figure 7:
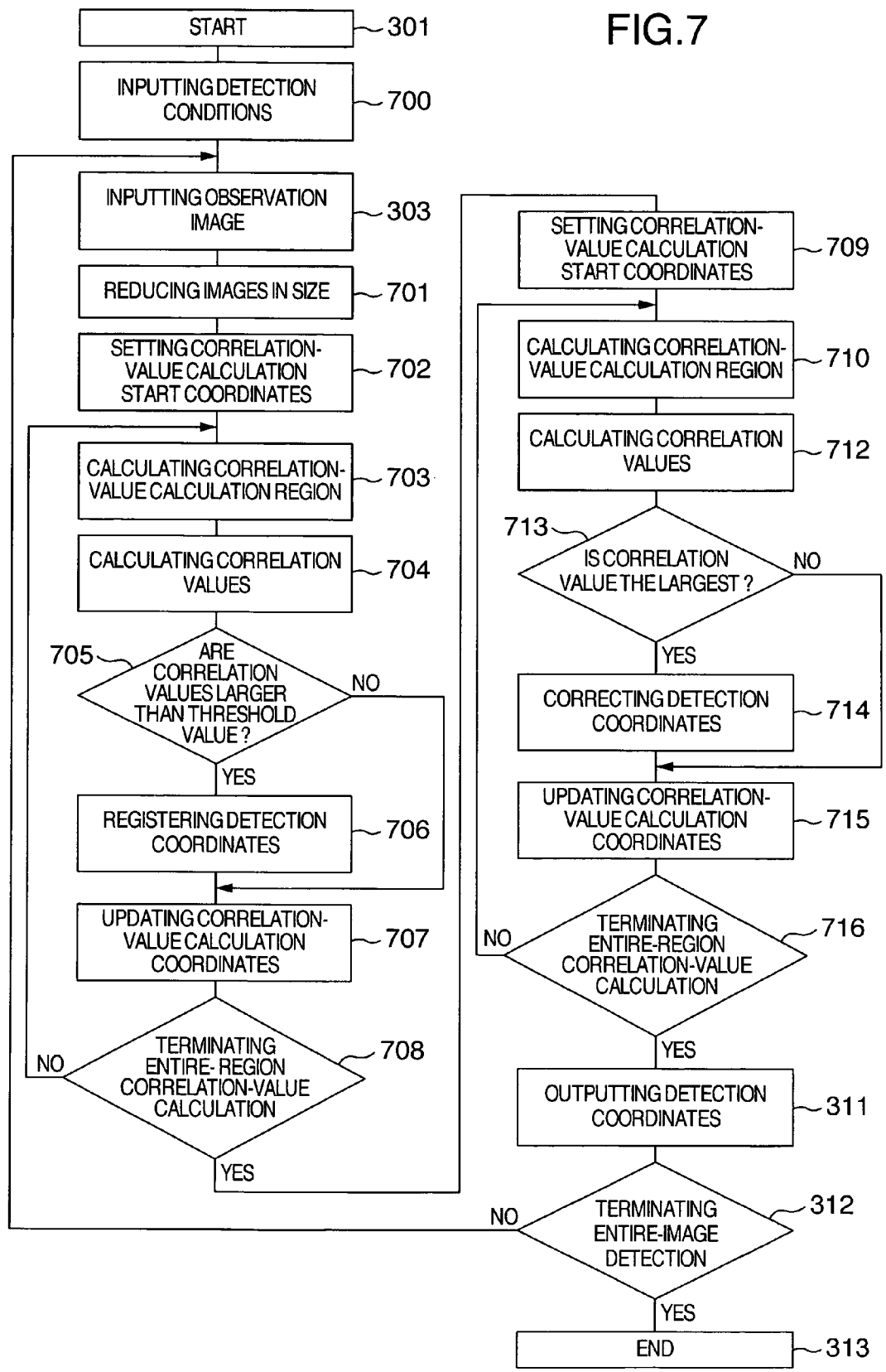
FIG. 7 is an explanatory diagram for explaining the fourth embodiment of processing in the pattern search method according to the present invention.

Referring to FIG. 7, the explanation will be given below concerning the fourth embodiment of processing in the pattern search method according to the present invention. The processing is started from Start at the step 301. In a detection-condition input processing at a step 700, the detection conditions are inputted which include the size of the detection image region 101 and that of the observation image 102, the threshold values, the range of the relative coordinates, and the reduction ratio and reduction method for the images. In the observation-image input processing at the step 303, the observation image 102 is inputted. In an image reduction processing at a step 701, the detection image region 101 and the observation image 102 are reduced in size, thereby creating the reduced detection image region 601 and the reduced observation image 602. In a correlation-value calculation-start-coordinate set processing at a step 702, which corresponds to the step 304, coordinates at which calculation of correlation values between the reduced detection image region 601 and the reduced observation image 602 is to be started are set.

In a correlation-value calculation-region calculation processing at a step 703, which corresponds to the step 305, a range of the common region 604 is detected. Here, the range of the common region 604 is the target in which the correlation values are to be calculated. In a correlation-value calculation processing at a step 704, which corresponds to the step 306, the correlation values falling in the range of the common region 604 are calculated. In a first loop, the correlation values are calculated at the coordinate positions set in the correlation-value calculation-start-coordinate set processing at the step 702.

In a judgment processing at a step 705, which corresponds to the step 307, it is judged whether or not the correlation values are larger than the threshold value. If the correlation values are larger than the threshold value, the processing proceeds to a step 706. Meanwhile, if the correlation values are not larger than the threshold value, the processing proceeds to a step 707. In a detection-coordinate registration processing at the step 706, which corresponds to the step 308, relative coordinate positions between the reduced detection image region 601 and the reduced observation image 602 are registered. In a correlation-value calculation-coordinate update processing at the step 707, which corresponds to the step 309, new coordinates at which calculation of the correlation values is to be performed next are set. In a judgment on entire-region correlation-value calculation termination at a step 708, which corresponds to the step 310, it is judged whether or not the pattern matching processing in the entire region of the range of the relative coordinates inputted at the detection-condition input step 700 has been terminated. If the pattern matching processing in the entire region has been not terminated, the processing returns to the correlation-value calculation-region calculation processing at the step 703. In a second loop, at the step 703, the range of the common region 604 is detected at the new coordinates updated by the correlation-value calculation-coordinate update processing at the step 707. If the pattern matching processing in the entire region has been terminated, the processing proceeds to a step 709.

The detection coordinates acquired by the detection-coordinate registration processing at the step 706 exhibit only a low accuracy, since the detection coordinates have been determined using the reduced detection image region 601 and the reduced observation image 602. Consequently, hereinafter, in a proximity to the detection coordinates determined at the step 706, the high-accuracy position detection will be performed using the detection image region 101 and observation image 102 before being reduced. The range of the proximity in which the position detection is to be performed can be inputted in the detection-condition input processing at the step 700.

In a correlation-value calculation-start-coordinate set processing at the step 709, which corresponds to the step 304, coordinates at which calculation of correlation values between the detection image region 101 and the observation image 102 is to be started are set. In a correlation-value calculation-region calculation processing at a step 710, which corresponds to the step 305, a range of the common region 104 is detected. Here, the range of the common region 104 is the target in which the correlation values are to be calculated. In a correlation-value calculation processing at a step 712, which corresponds to the step 306, the correlation values falling in the range of the common region 104 are calculated. In a first loop, the correlation values are calculated at the coordinate positions set in the correlation-value calculation-start-coordinate set processing at the step 709.

In a judgment processing at a step 713, it is judged whether or not a correlation value calculated at the step 712 is the largest of the correlation values calculated in the loops until the last time. If the correlation value is the largest, the processing proceeds to a step 714. Meanwhile, if the correlation value is not the largest, the processing proceeds to a step 715. In the first loop, since the correlation value calculated at the step 712 becomes the largest, the processing proceeds to the step 714. In a detection-coordinate correction processing at the step 714, the detection coordinates acquired in the loops until the last time are corrected by detection coordinates for which the correlation value becomes the largest. In the first loop, the start coordinates set at the step 709 are registered. In a correlation-value calculation-coordinate update processing at the step 715, which corresponds to the step 309, new coordinates at which calculation of the correlation values is to be performed next are set. In a judgment on entire-region correlation-value calculation termination at a step 716, which corresponds to the step 310, it is judged whether or not the pattern matching processing in the entire region in a proximity to the positions detected at the step 303 to the step 708 has been terminated. If the pattern matching processing in the entire region has been not terminated, the processing returns to the correlation-value calculation-region calculation processing at the step 710. In a second loop, at the step 710, the range of the common region 104 is detected at the new coordinates updated by the correlation-value calculation-coordinate update processing at the step 715. If the pattern matching processing in the entire region has been terminated, the processing proceeds to the step 311. Hereinafter, from the step 311, the processing proceeds to the step 312 and the step 313.

In the detection-coordinate output processing at the step 311, the coordinates registered in the detection-coordinate correction processing at the step 714 are outputted. As sequence of the coordinates to be outputted in the detection-coordinate output processing at the step 311, the sequence registered at the step 714 may be used. Otherwise, the sequence in size of the correlation values calculated in the correlation-value calculation processing at the step 712 may also be used.

Similarly to the above-described embodiments, in order to limit the number of the coordinates to be outputted, an upper-limit of the number of the coordinates to be outputted may be set in the detection-condition input processing at the step 700. In the detection-coordinate correction processing at the step 714, if the plural coordinates registered therein are extremely close to each other, or if the correlation values between two points are monotonously increasing or monotonously decreasing, the portion whose correlation value is the highest of them all is selected as the representative point, and only the representative point may be outputted.

Figure 8A:
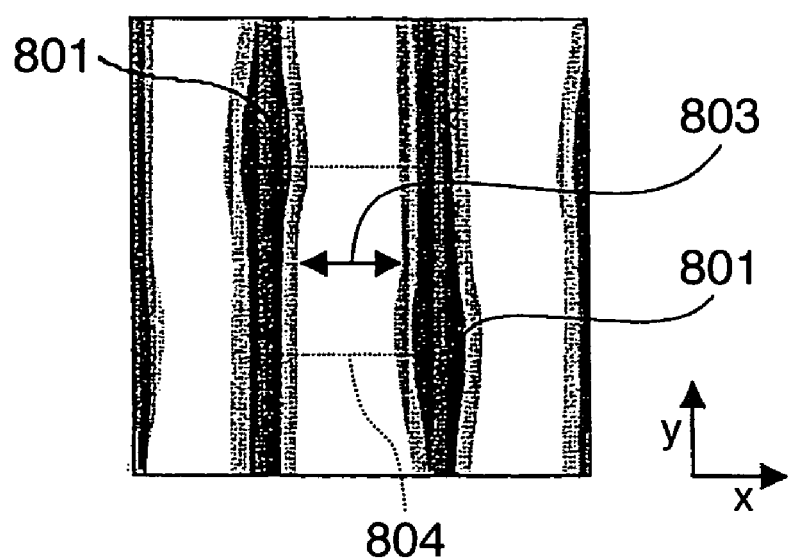
FIGS. 8A-8C are explanatory diagrams for explaining effects of the pattern search method according to the present invention.
Figure 8B:
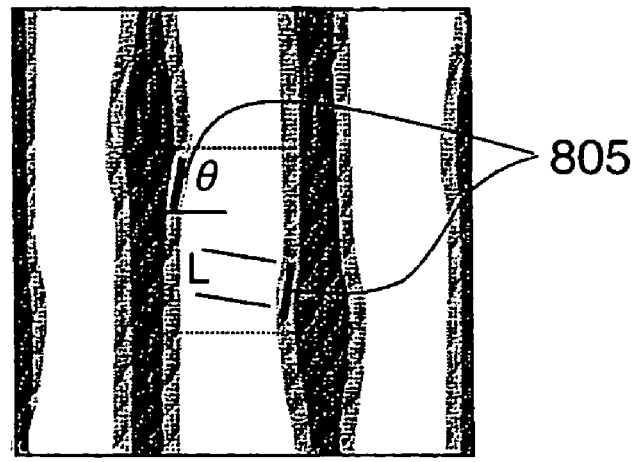

Referring to FIG. 8, the explanation will be given below concerning effects of the pattern search method in the present embodiment. FIG. 8A illustrates an example of the observation image acquired by the scanning electron microscope. As illustrated in FIG. 8A, the observation image has the following pattern configuration. Namely, although the observation image includes comparatively monotonous line patterns, the mask is designed in such a manner that a contact-hole connection portion 801 in each line pattern has a bulge. In the observation image, a spacing indicated by an arrow 803 is the length-measuring target. Accordingly, as the conventional technologies, a rectangular region 804 including the length-measuring target 803 is cut out to be employed as a template. As illustrated in FIG. 8B, in this rectangular region 804, there exist only two effective edge portions 805 which are necessary for performing the position detection in the y direction. Consequently, if this rectangular region 804 is employed as the template, there exists a possibility that an error will occur in the position detection. Assuming that the two edge portions 805 are of the same configuration, and letting the length thereof be L, and the angle that the portions 805 form with the x axis be θ, information amount Ty which is effective for determining the positions in the y direction is represented by the following expression.

$$Ty = 2L \cos \theta \qquad \text{Expression 3}$$

Figure 8C:
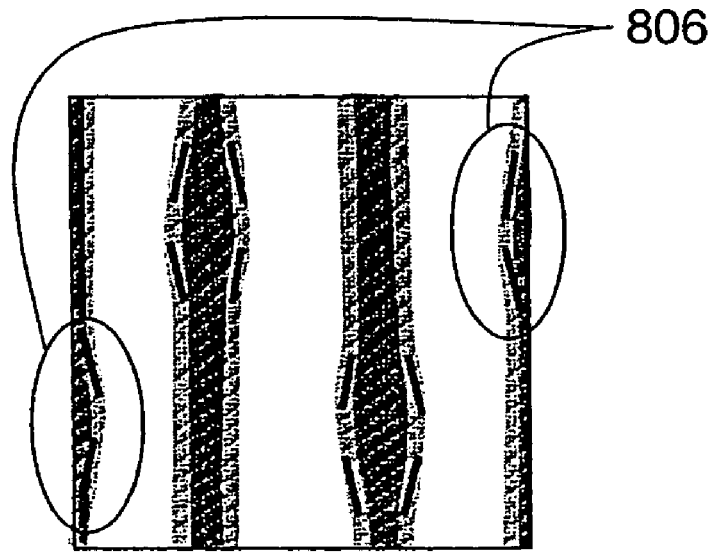

Meanwhile, just like an example of the present invention illustrated in FIG. 8C, when entire picture of the observation image is selected as the detection image region, there exist the twelve edge portions within the detection image region. Consequently, information amount Wy which is necessary for performing the position detection in the y direction is represented by the following expression.

$$Wy = 12L \cos \theta \qquad \text{Expression 4}$$

When the length-measuring processing for line width or the like of a circuit pattern is performed continuously and automatically by a measurement device including the scanning electron microscope, there are some cases where the edge portions 806 positioned away from the image center do not come into the field-of-view due to a detection error in intermediate magnification or an accuracy error in image shift. For example, assume that the edge portions 806 which are n in number do not come into the field-of-view. In such a case, information amount Wy' which is necessary for performing the position detection in the y direction is represented by the following expression.

$$Wy'=(12-n)L \cos \theta \qquad \text{Expression 5}$$

Accordingly, when the entire image is selected as the detection image region just like the present example, the effective information amount which is necessary for performing the position detection in the y direction is larger than the one in the case illustrated in FIG. 8B where a part of the image is selected as the template.

As a result, it becomes possible to execute the position detection with a higher accuracy than in the conventional scheme. Also, it is unnecessary for a user to find edges effective for the position determination, and to select the template so that the template will include the edges. Consequently, it becomes possible to reduce a burden on the user. Moreover, none of an inappropriate template will be selected which includes only a little of the edge information necessary for the position determination. This allows an enhancement in the detection reliability.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A pattern search method, for searching a pattern with a template, using a pattern search device, the method comprising the following steps implemented by the pattern search device:
  inputting an observation image with an amount of width which is substantially similar to width of an image of the template,
  relatively displacing the image of the template with reference to said observation image in sequence, with changing a width of a common region between the image of the template and said observation image defined as an overlapped area of the image of the template and the observation image, shapes of the observation image and the image of the template in the common region being equal with each other,
  judging whether a predetermined value regarding the width of the common region is equal to or greater than a threshold value, and
  relatively calculating degree of similarity between the observation image and the template for the pattern search, in accordance with an amount of the width of the common region.

2. The pattern search method according to claim 1, wherein dimension of the image of the template or dimension of said observation image is modified so that the image of the template is generated from an image which is of the same magnification and has substantially the same size as magnification and size of said observation image.

3. The pattern search method according to claim 1, wherein the image of the template is generated from an image generation source which is the same as that of said observation image.

4. The pattern search method according to claim 1, further comprising steps of:
  superimposing the image of the template on said observation image; and
  setting a start-point position at which execution of said superimposing and displacing steps are to be started.

5. The pattern search method according to claim 1, wherein said calculating step performs the calculation of said degree of similarity when said common region exists within a predetermined central region of said observation image.

6. The pattern search method according to claim 1, wherein said calculating step performs the calculation of said degree of similarity when said common region is larger than a predetermined area.

7. The pattern search method according to claim 1, wherein said calculating step performs the calculation of said degree of similarity when ratio of area of said common region relative to said observation image is larger than a predetermined threshold value.

8. The pattern search method according to claim 1, wherein said calculating step performs the calculation of said degree of similarity when transverse width of said common region is larger than a predetermined threshold value, or when longitudinal width of said common region is larger than a predetermined threshold value.

9. The pattern search method according to claim 1, wherein said calculating step performs the calculation of said degree of similarity when ratio of transverse width of said common region relative to said observation image is larger than a predetermined threshold value, or when ratio of longitudinal width of said common region relative to said observation image is larger than a predetermined threshold value.

10. The pattern search method according to claim 1, wherein said calculating step calculates a correlation value between said observation image and the image of the template in said common region, and calculates a value or a function value as said degree of similarity, said value being acquired by multiplying said correlation value by a coefficient which represents area of said common region, said function value being acquired by defining said correlation value and said area of said common region as variables thereof.

11. A pattern search method, for searching a pattern with a template, using a pattern search device, the method comprising the following steps implemented by the pattern search device:
  inputting an observation image,
  reducing in size said observation image, such that width of the reduced observation image is substantially similar to width of an image of the template
  relatively displacing the image of the template with reference to said reduced observation image in sequence, with changing a width of a common region between the image of the template and said reduced observation image defined as an overlapped area of the image of the template and the reduced observation image, shapes of the observation image and the image of the template in the common region being equal with each other,
  judging whether the width of the common region is equal or greater than a threshold value, relatively calculating degree of similarity between the observation image and the template for the pattern search, in accordance with an amount of the width of the common region, and
  enlarging in size said reduced observation image thereby to restore the original observation image.

12. A non-transitory computer-readable medium which stores a program for causing a computer to execute said pattern search method according to claim 1.

13. A pattern search device for searching a pattern with a template, comprising:
   an observation image input device for inputting an observation image with an amount of width which is substantially similar to width of an image of the template, and
   an arithmetic-logic operation device for performing a pattern matching processing, wherein said arithmetic-logic operation device:
      (a) judges whether a width of a common region is equal to or greater than a threshold value, the common region being defined as an area of overlap of the image of the template and the observation image, shapes of the observation image and the image of the template in the common region being equal with each other, and
      (b) relatively calculates degree of similarity between the observation image and the template for the pattern search, in accordance with an amount of the width of the common region, as a width of said common region between said image of the template and said observation image changes.

14. The pattern search method according to claim 1, wherein magnifications of the image of the template and the observation image are equal to each other.

15. The pattern search method according to claim 11, wherein magnifications of the image of the template and the observation image are equal to each other.

16. The pattern search device for searching a pattern with a template according to claim 13, wherein magnifications of the image of the template and the observation image are equal to each other.

17. The pattern search method to claim 1, wherein the calculating step includes calculating degree of similarity when the width of the common region is equal to or grater than the threshold value.

* * * * *